B. G. LAMME.
SPEED CONTROL FOR INDUCTION MOTORS.
APPLICATION FILED OCT. 21, 1916.
1,387,496.
Patented Aug. 16, 1921.
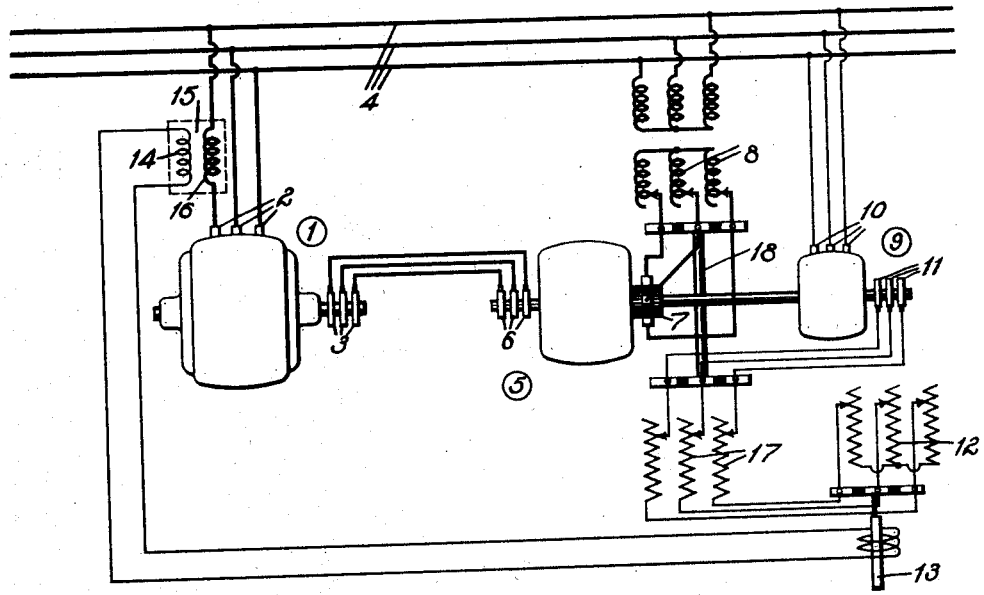
WITNESSES:
INVENTOR
Benjamin G. Lamme.
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SPEED CONTROL FOR INDUCTION-MOTORS.

1,387,496. Specification of Letters Patent. Patented Aug. 16, 1921.

Application filed October 21, 1916. Serial No. 126,904.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Speed Control for Induction-Motors, of which the following is a specification.

My invention relates to systems of control for induction motors and it has for its object to provide a system that shall be capable of application to induction motors of the largest sizes and which shall be flexible and economical in operation and substantially free from surging and allied harmful phenomena.

The single figure of the accompanying drawing is a diagrammatic view of an induction motor, together with its attendant supply and control circuits, constructed in accordance with a preferred form of my invention.

An old and well-known method of varying the speed of a large-capacity induction motor is to connect a frequency-changer and adjustable transformers between the secondary winding thereof and the source. Energy derived from the secondary winding during under-synchronous operation is suitably changed in frequency in the frequency-converter and in voltage in the transformer for return to the system. Similarly, energy derived from the system has been appropriately changed in voltage in the transformer and in frequency in the frequency-converter for introduction in the secondary of the main induction motor for over-synchronous operation.

The frequency-changer of the prior systems has been either self-propelled or driven by a separate motor. By variations in the speed of said frequency-changer, the desired alterations in the ratio of frequency conversion therein have been obtained.

In my copending application, Serial No. 583, filed Jan. 5, 1915, patented Apr. 15, 1919, No. 1,300,742, and assigned to the Westinghouse Electric & Manufacturing Company, there is disclosed a system of the character indicated and the necessity is shown, for stable operation, of having the frequency imposed upon the secondary member of the main induction motor by the frequency-changer fall off, with an increase of load upon the main induction motor, by substantially the same percentage that the speed of the main induction motor would be reduced because of "resistance slip" under like load conditions. In other words, there is pointed out the desirability of having the load-speed characteristic of the driving motor for the frequency changer approximate, in shape, the load-speed characteristic of the main induction motor when operating with a suitable amount of resistance in the secondary winding thereof under like conditions of load.

Two distinct methods of obtaining the desired speed adjustment of the frequency converter are disclosed in the aforementioned application. One of these is by driving the frequency-converter by an alternating-current motor of the commutator type, adjusting the field voltage of said motor in accordance with the load on the main induction motor through a current transformer in order to obtain the desired speed adjustment thereof. The other method of speed control is to place a mechanical brake of the electrically operated type upon the shaft of the frequency-converter and to energize said brake in accordance with the load on the main induction motor. Since the normal load on the motor driving the frequency-changer consists solely of the iron, copper, friction and windage losses in the two auxiliary machines, it is apparent that a brake of relatively small dimensions will suffice to produce the desired speed reduction in the frequency-converter.

By the present invention, I provide an automatic speed-control system for the frequency-converter of a system of the character described that is generally similar to the first of the aforementioned systems but I employ a driving motor of the variable-speed induction type for the frequency converter.

I am aware of the British patent to Heyland, 4627 of 1911, Fig. 2 of which shows an auxiliary, variable-speed induction motor coupled to drive the speed-controlling frequency changer of a main induction motor; but the following marked distinction should be noted between the system of Heyland and that disclosed herein.

Heyland energizes the primary winding of his auxiliary induction motor through current transformers associated with the supply leads of the main motor. Consequently, an increase in the load of the main motor increases the applied primary voltage and the speed of the auxiliary induction motor, increasing the speed of the frequency changer and, therefore, tending to reduce the slip frequency and increase the speed of the main induction motor.

In my system, on the other hand, the arrangement is such that an increase in the main-motor load decreases the speed of the auxiliary driving motor and of the frequency changer, increasing the slip frequency of the main motor and decreasing the speed thereof.

As pointed out hitherto and as more fully explained in my aforementioned application, the desired effect, for economy and stability of operation, is that produced by my system, and the effect of the specific connections disclosed by Heyland is diametrically opposed thereto.

Referring to the drawing for a more detailed understanding of my invention, a main induction motor is shown at 1, said motor being provided with stator terminals 2—2 and with rotor terminals 3—3 in the form of the usual slip rings. Energy for the operation of the motor 1 is derived from any suitable source, such, for example, as a polyphase supply system 4 directly connected to the stator terminals 2—2.

A frequency-converter is shown at 5 and may take any one of a variety of forms, such, for example, as that shown in U. S. Patent No. 682,942, issued to the Westinghouse Electric & Manufacturing Company on September 17, 1901, upon an application filed by myself. Briefly speaking, a frequency converter of the character designated comprises an armature, the winding of which is connected both to the segments of a commutator and to appropriate slip rings. Said armature is driven at a speed corresponding to the difference in frequency between the input and the output frequencies, as is well known in the art. If said frequency changer is not of the self-propelled type, the stator thereof may be unprovided with field windings or, in fact, the stator may be done away with entirely and an iron keeper or armature may rotate with the main armature to perform the function of the usual stator in closing the magnetic circuit.

The machine 5 is provided with slip rings 6—6 connected to the slip rings 3—3 of the main motor 1 and is also provided with a commutator 7 connected to the supply system 4 through adjustable transformers 8—8. The frequency changer 5 is driven by an induction motor 9 provided with stator terminals 10 directly connected to the supply mains 4 and with rotor terminals 11 which are connected in star relation through adjustable resistors 12 and 17. The effective resistance of the resistor 17 is subject to control in consonance with the transformers 8 by means of a connecting link 18 or by other equivalent electrical or mechanical interlocking. The effective resistance of the resistor 12 is subject to adjustment by a relay device 13 energized from the secondary winding 14 of a transformer 15, the primary winding 16 of which is connected in one of the supply leads of the rotor 1 so that said resistance is increased with an increase in the motor load.

Having thus described the arrangement of a system embodying my invention, the operation is as follows: The motor 1 is started in any desired manner and brought up to the desired percentage of synchronous speed. The frequency changer 15 is operated at the proper speed to appropriately change the frequency of the secondary energy of the motor 1 for return to the system 4 by manual adjustment of the resistor 17 and, simultaneously, the transformers 8 are adjusted to produce the proper change in voltage of the energy flowing from the commutator 7 for feeding to the system 4. Assuming an increase in the load on the motor 1, the voltage of the winding 14 increases, energizing the device 13 to a greater extent and drawing up the core thereof, increasing the effective resistance of the resistor 12 and slightly lowering the speed of the induction motor 9, as is desired.

While I have shown my invention in a preferred form, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a main induction motor, of a frequency-changer operatively connected thereto for coöperating in the speed regulation thereof, an auxiliary driving motor of the induction type mechanically coupled to said frequency changer, and means for so regulating the speed of said auxiliary motor in accordance with the load of said main motor as to reproduce the speed changes in said main motor that would be produced by resistance slip under like load conditions.

2. The combination with a main induction motor, of a frequency changer operatively connected thereto for coöperating in the speed regulation thereof, an auxiliary driving motor of the induction type mechanically coupled to said frequency changer, said auxiliary motor being provided with an adjustable resistor in the secondary winding thereof, and electro-responsive means energized in accordance with the load on said main motor and operative to vary the effective resistance of said resistor directly with changes in the main motor load.

3. The combination with a source of alternating current, of a main induction machine provided with primary and secondary windings, connections from said primary winding to said source, a frequency-changing dynamo-electric machine, connections between said secondary winding and said source, including said frequency-changing machine, an auxiliary induction motor coupled to drive said frequency-changer at under-synchronous speed, and means for imparting a drooping load speed characteristic to said auxiliary induction motor with an increase of load on said main motor.

4. The combination with a source of alternating current, of a motor aggregate to which it is desired to impart a drooping load-speed characteristic and embodying a main induction motor having primary and secondary windings, connections from said source to the primary winding of said motor, a frequency-changing machine, connections from said secondary winding through said frequency-changer to said source, and a driving motor for said frequency-changer having a load-speed characteristic in shape similar to that which it is desired to impart to the aggregate.

In testimony whereof, I have hereunto subscribed my name this 16th day of Oct. 1916.

BENJ. G. LAMME.